United States Patent
Hei et al.

(10) Patent No.: US 8,256,841 B2
(45) Date of Patent: Sep. 4, 2012

(54) ACTIVELY SECURABLE BASE FOR A MODULAR CHILD RESTRAINT SYSTEM

(75) Inventors: Joseph Hei, Palo Alto, CA (US); Bryan T. White, Fremont, CA (US)

(73) Assignee: Orbit Baby, Inc., Newark, CA (US)

( * ) Notice: Subject to any disclaimer, the term of this patent is extended or adjusted under 35 U.S.C. 154(b) by 0 days.

(21) Appl. No.: 12/953,334

(22) Filed: Nov. 23, 2010

(65) Prior Publication Data

US 2011/0074195 A1 Mar. 31, 2011

Related U.S. Application Data

(63) Continuation of application No. 11/131,568, filed on May 17, 2005, now Pat. No. 7,887,129.

(60) Provisional application No. 60/571,791, filed on May 17, 2004, provisional application No. 60/610,774, filed on Sep. 17, 2004, provisional application No. 60/610,686, filed on Sep. 17, 2004, provisional application No. 60/611,177, filed on Sep. 17, 2004, provisional application No. 60/610,800, filed on Sep. 17, 2004.

(51) Int. Cl.
*A47C 1/08* (2006.01)
(52) U.S. Cl. .............................. 297/256.16; 297/256.13
(58) Field of Classification Search ............... 297/256.1, 297/256.16, 250.1, 256.13, 468
See application file for complete search history.

(56) References Cited

U.S. PATENT DOCUMENTS

| | | | |
|---|---|---|---|
| 4,750,783 A | 6/1988 | Irby et al. | |
| 4,762,364 A | 8/1988 | Young | |
| 4,834,404 A | 5/1989 | Wood | |
| 4,936,629 A | 6/1990 | Young | |
| 5,207,476 A | 5/1993 | Payne | |
| 5,341,530 A | 8/1994 | Ward | |
| 5,462,333 A | 10/1995 | Beauvais | |
| 5,540,365 A | 7/1996 | LaMair | |
| 5,562,548 A | 10/1996 | Pinch et al. | |
| 5,575,531 A | 11/1996 | Gauger et al. | |
| 5,582,461 A | 12/1996 | Pickles | |
| 5,611,596 A * | 3/1997 | Barley et al. ............. | 297/256.13 |

(Continued)

FOREIGN PATENT DOCUMENTS

GB 2207043 A 1/1989

OTHER PUBLICATIONS

U.S. Appl. No. 11/131,662, filed May 17, 2005, by Hei et al.

(Continued)

*Primary Examiner* — David Dunn
*Assistant Examiner* — Erika Garrett
(74) *Attorney, Agent, or Firm* — Morrison & Foerster LLP

(57) ABSTRACT

A child restraint system for use in vehicles comprises a seat portion and a base. The base secures the child restraint system to a vehicle seat with a vehicle restraint such as a seat belt or a LATCH system. The base both engages the vehicle restraint and includes a force-multiplying mechanism for tensioning the vehicle restraint. Tensioning the vehicle restraint secures the base by forcing the base against the vehicle seat. An embodiment of the base includes a platform configured to rest on the vehicle seat, an upright member joined to the platform, and a tensioning device, including a force-multiplying mechanism, for tensioning the vehicle restraint.

25 Claims, 14 Drawing Sheets

U.S. PATENT DOCUMENTS

| | | | | |
|---|---|---|---|---|
| 5,658,044 | A | 8/1997 | Krevh | |
| 5,659,931 | A | 8/1997 | Anscher | |
| 5,775,770 | A | 7/1998 | Tunney | |
| 5,839,789 | A | 11/1998 | Koledin | |
| 5,908,223 | A | 6/1999 | Miller | |
| 5,961,180 | A | 10/1999 | Greger et al. | |
| 5,971,476 | A | 10/1999 | Gibson et al. | |
| 6,000,753 | A | 12/1999 | Cone, II | |
| 6,017,088 | A | 1/2000 | Stephens et al. | |
| 6,042,182 | A | 3/2000 | Geis et al. | |
| 6,049,954 | A | 4/2000 | Britto | |
| 6,076,894 | A | 6/2000 | Busch | |
| 6,145,927 | A | 11/2000 | Lo | |
| 6,189,970 | B1 | 2/2001 | Rosko | |
| 6,193,312 | B1 * | 2/2001 | Yoshida et al. | 297/256.16 |
| 6,220,662 | B1 * | 4/2001 | Franco-Vila et al. | 297/256.13 |
| 6,283,545 | B1 | 9/2001 | Ernst | |
| 6,318,799 | B1 | 11/2001 | Greger et al. | |
| 6,331,032 | B1 | 12/2001 | Haut et al. | |
| 6,393,677 | B1 | 5/2002 | Anscher | |
| 6,431,647 | B2 | 8/2002 | Yamazki | |
| 6,505,887 | B2 * | 1/2003 | Hampton | 297/256.1 |
| 6,508,510 | B2 | 1/2003 | Yamazaki | |
| 6,554,358 | B2 | 4/2003 | Kain | |
| 6,561,577 | B2 | 5/2003 | Kelly | |
| 6,619,734 | B2 | 9/2003 | Helmsderfer | |
| 6,764,135 | B2 * | 7/2004 | Sasaki et al. | 297/256.16 |
| 6,779,842 | B2 | 8/2004 | McNeff | |
| 6,796,610 | B2 * | 9/2004 | Nakagawa et al. | 297/256.16 |
| 6,857,700 | B2 | 2/2005 | Eastman et al. | |
| 6,863,345 | B2 | 3/2005 | Kain | |
| 6,938,954 | B1 | 9/2005 | Hendren et al. | |
| 7,163,265 | B2 | 1/2007 | Adachi | |
| 7,338,122 | B2 | 3/2008 | Hei et al. | |
| 7,740,313 | B1 | 6/2010 | Hei et al. | |
| 7,789,413 | B2 | 9/2010 | Hei et al. | |
| 2003/0151286 | A1 | 8/2003 | Kain | |

OTHER PUBLICATIONS

Supplementary European Search Report mailed on Jun. 20, 2011, for EP Patent Application No. 05753700.03, filed on May 17, 2005, 3 pages.

* cited by examiner

ACTIVELY SECURABLE BASE FOR A MODULAR CHILD RESTRAINT SYSTEM

CROSS-REFERENCE TO RELATED APPLICATIONS

This application is a continuation of and claims the benefit of U.S. Ser. No. 11/131,568, filed May 17, 2005, entitled Actively Securable Base for a Modular Child Restraint System, U.S. Provisional Application No. 60/571,791 filed on May 17, 2004 and titled "Child Car Seat with Improvements," and U.S. Provisional Application Nos. 60/610,774, 60/610,686, 60/611,177, and 60/610,800 each filed on Sep. 17, 2004 and titled, respectively, "Modular Child Restraint System that Involves Rotation and Removal," "Actively Securing Child Restraint Base Interface that Amplifies User Leverage," "Modular Upgradeable Child Restraint System," and "Child Vehicle Restraints;" all of which are incorporated herein by reference in their entirety and for all purposes. This application is related to U.S. application Ser. No. 11/132,103, now U.S. Pat. No. 7,338,122 titled "Modular Child Restraint System" and U.S. application Ser. No. 11/132,662 titled "Improvements for Child Restraint Systems", both filed on even date herewith and incorporated herein by reference.

BACKGROUND OF THE INVENTION

1. Field of the Invention

The present invention relates generally to the field of transportation safety and more particularly to child carriers for use in vehicles.

2. Description of the Prior Art

Children's car seats have made automobile travel substantially safer for children, however, as most parents are aware, properly installing such seats is typically difficult and sometimes frustrating. Commonly, installing such seats requires the use of cumbersome seat belt clips, the need to feed the seat belt through narrow spaces, and the need to pull as hard as possible on the end of the seat belt while putting one's full weight into the child's seat. Thus, children's car seats are often improperly installed because adults do not understand how to properly install the car seat, will not take the time to perform the installation correctly, or are physically unable to produce the necessary leverage required to sufficiently tighten the seat belt that secures the child's seat.

Therefore, what is needed is a child's car seat that installs quickly, easily, and securely.

SUMMARY

The present invention provides a child restraint system for use in vehicles such as automobiles. The system comprises a seat portion and a base. In modular embodiments of the system, the base and the seat portion are detachable. In some other embodiments the two are integrally joined.

The base of the invention secures the child restraint system to a vehicle seat with a vehicle restraint such as a seat belt or a LATCH system (Lower Anchors and Tethers for CHildren). The base comprises means for engaging the vehicle restraint and force-multiplying means for tensioning the vehicle restraint. Tensioning the vehicle restraint secures the base by forcing the base against the vehicle seat.

The vehicle restraint can be, for example, a seat belt attached to the vehicle seat, or a LATCH system comprising a LATCH anchor attached to the vehicle seat and a LATCH tether attached to the base. In the case of the seat belt, the means for engaging the vehicle restraint can include a clasp, or similar fastening device, for receiving the seat belt. In the case of the LATCH system, the means for engaging the vehicle restraint can include clips that attach the LATCH tethers to their respective anchors. The force-multiplying means for tensioning the vehicle restraint can be any device, be it mechanical, pneumatic, hydraulic, or otherwise, that provides a mechanical advantage when tensioning the vehicle restraint. Mechanical examples employ screws, levers, worm-gears, or ratchet and pawl assemblies, for instance.

An exemplary embodiment of the base comprises a platform configured to rest on the vehicle seat, an upright member joined to the platform, and a tensioning device including a force-multiplying mechanism for tensioning the vehicle restraint. The upright member is oriented so as to substantially contact the back rest of the vehicle seat. As the vehicle restraint is tensioned the upright member is forced against the seat back while the platform is forced down into the seat pan. The base can further include a foot, that in some embodiments is configured to extend between back and seat cushions of the vehicle seat.

In various embodiments the platform and upright member are either integrally joined, pivotally attached, or hingedly attached. Accordingly, in some embodiments the tensioning device drives the upright member relative to the platform. In some of the embodiments where the upright member and platform are in some way movably attached, the upright member can be conveniently folded down over the platform when not in use.

The tensioning device can include, for example, a lead screw, a worm-gear, or a ratchet and pawl to provide a mechanical advantage. The mechanical advantage allows a user, or another source of power such as an electric motor, to impart a substantial tension to the vehicle restraint. Thus, in some embodiments the tensioning device includes a torque limiter to prevent over-tensioning and potential damage to the vehicle seat or base.

DETAILED DESCRIPTION OF THE INVENTION

The present invention provides child restraint systems for use in vehicles such as automobiles, aircraft, boats, buses, and so forth. The restraint system comprises a seat portion and a base. The seat portion holds the child and is typically provided with a restraint mechanism such as a harness. The base serves as the primary interface between the seat portion and the vehicle and is designed to be left attached thereto. The base advantageously provides greater child security, ease of use, and ease of installation and removal. The restraint system can be modular or integral. In modular versions the seat portion is detachable from the base while in integral versions the two are permanently joined. One advantage of the modular design is that the same base can be used to support seat portions that are adapted for different stages of childhood such as for infants, toddlers, and older children. Thus, as a child grows, only the seat portion needs to be upgraded.

The base includes a tensioning device for adjusting the tension of a vehicle restraint being used to restrain the base to a vehicle seat. Where the vehicle restraint is a child car seat LATCH system (Lower Anchors and Tethers for CHildren), the mechanism tensions the tethers of the system. Where the vehicle restraint is a seat belt, the mechanism braces against the inside of the seat belt to increase the tension in the seat belt. Thus, rather than cinch the seat belt by pulling on the end of the belt, as in the prior art, the user attaches the seat belt loosely around the base and then "expands" the base against the seat belt to achieve the desired snugness. The more the vehicle restraint is tensioned, the greater the base is forced against the vehicle seat.

In the following embodiments, two variations are illustrated, one in which the base comprises two hinged members and a tensioning device that drives the two members relative to one another around the hinge, and another variation in which the two members are integral. In either case, the tensioning device includes a force-multiplying device to provide a mechanical advantage so that a small force applied by the user is converted into substantially greater tension in the vehicle restraint. While the embodiments described below employ mechanical devices such as screws and levers in the force-multiplying device, it will be appreciated that other devices operating on other principles will also work. Thus, the present invention can be implemented hydraulically or pneumatically, for example.

Figure 1:
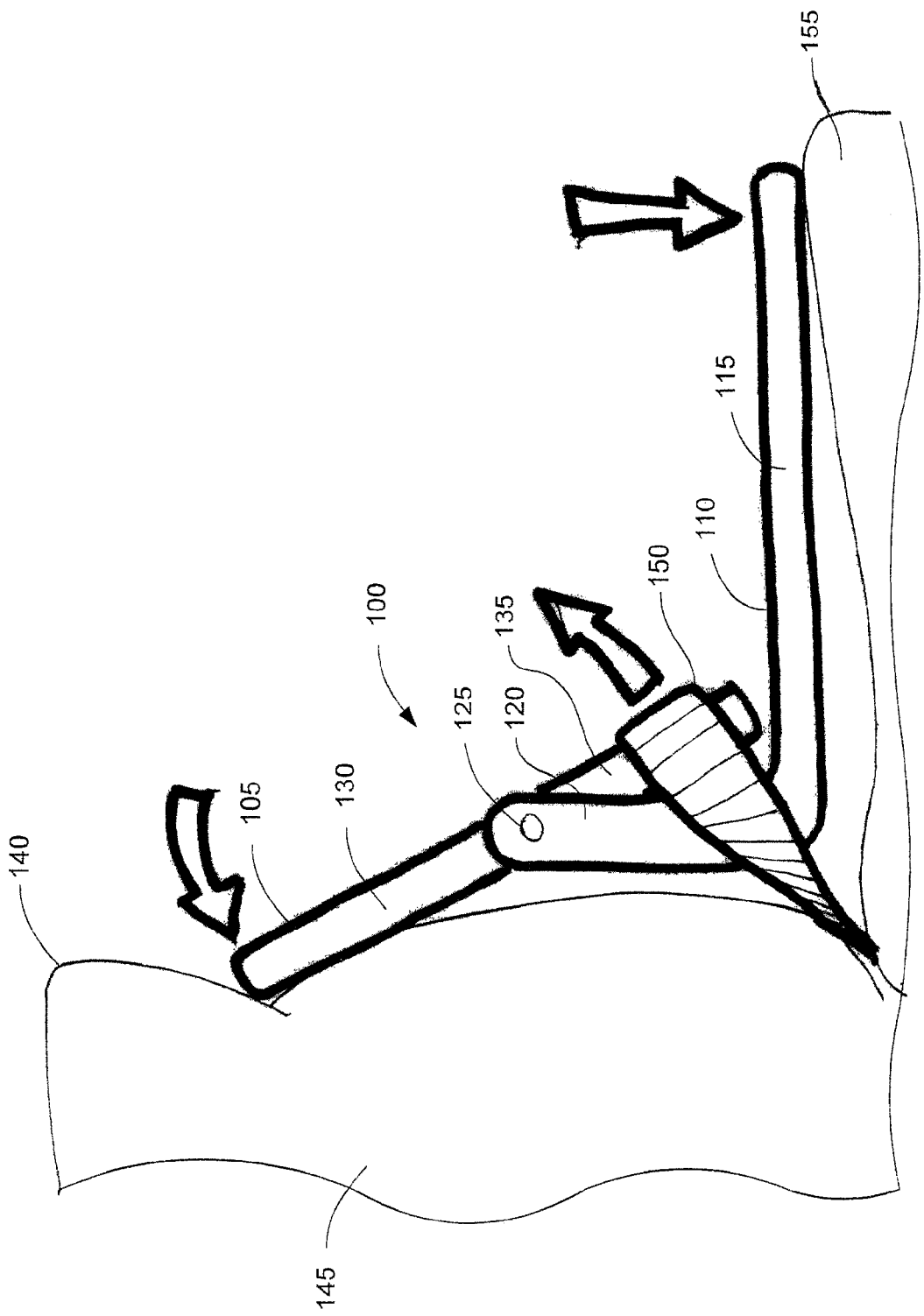
FIG. 1 is a schematic representation of an exemplary base, according to an embodiment of the present invention, secured to a vehicle seat and viewed from a side perspective.

FIG. 1 schematically illustrates an exemplary embodiment of a base 100 of the present invention. The base 100 comprises a generally flat upright member 105 and a platform 110 including a horizontal segment 115 and a vertical segment 120. The vertical segment 120 of the platform 110 is pivotally connected to the upright member 105 at a pivot point 125. The upright member 105 includes a top portion 130 and a lower portion 135 separated by the pivot point 125. A tensioning device (not shown) is used to drive the upright member 105 relative to the platform 110 around the pivot point 125. Upright member 105 is driven one way, as shown, to secure base 100 into a vehicle seat 140, or driven the opposite direction to remove the base 100.

From FIG. 1 it can be seen that tightening the base 100 forces the top portion 130 of the upright member 105 against the back 145 of the vehicle seat 140, while the lower portion 135 of the upright member 105 pushes against a seatbelt 150 to secure the base 100. Additionally, the platform 110 presses into the seat pan 155 of the vehicle seat 140. As can be seen in FIG. 1, tightening the tensioning device secures the base 100 by simultaneously wedging the base 100 into the vehicle seat 140 and tightening the base 100 against the seatbelt 150. Various tensioning devices for tightening the base 100 are described in more detail, below.

Figure 2:
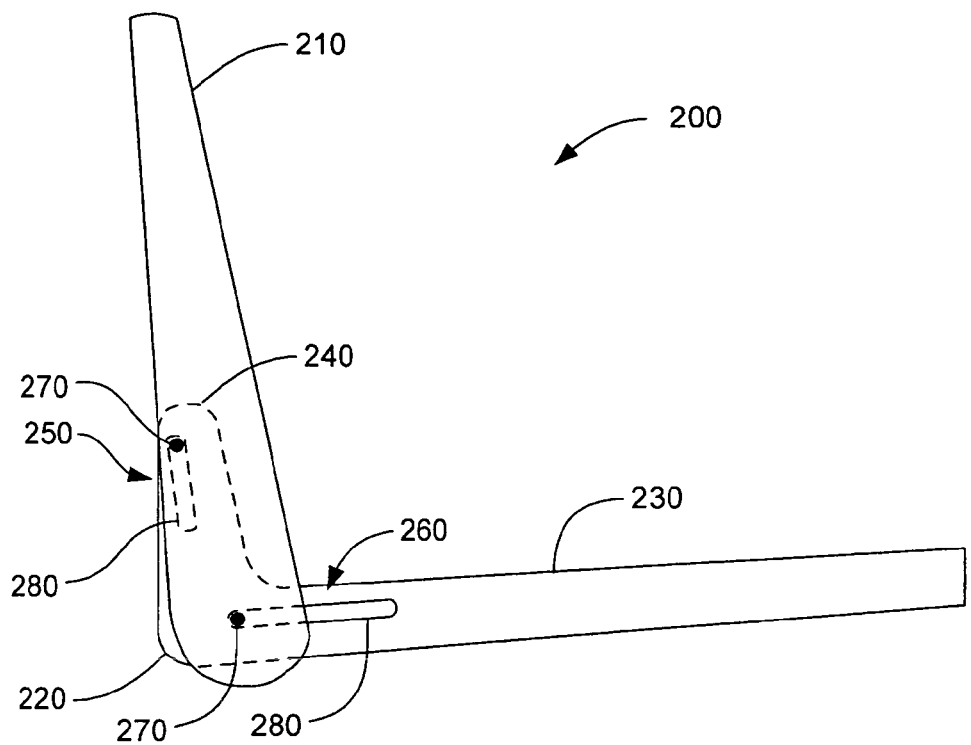
FIGS. 2 and 3 show a schematic representation of an exemplary base, according to another embodiment of the present invention, in two alternative positions.
Figure 3:
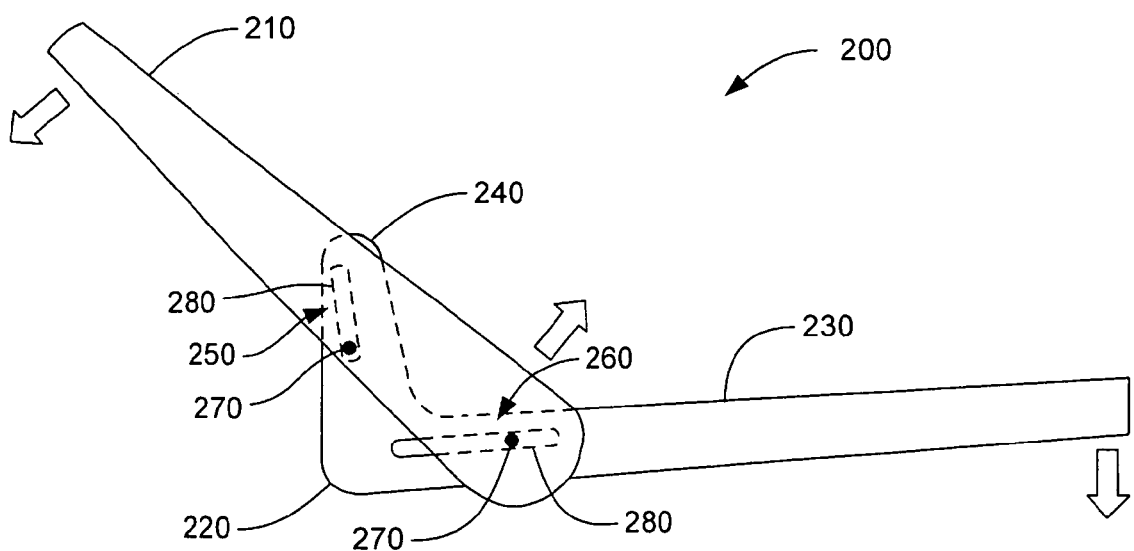

FIGS. 2 and 3 schematically illustrate another exemplary embodiment of a base 200 of the present invention. The base 200 comprises an upright member 210 and a platform 220 including a horizontal segment 230 and a vertical segment 240. The vertical segment 240 of the platform 220 engages the upright member 210 at a first slidable engagement mechanism 250, and the horizontal segment 230 engages the upright member 210 at a second slidable engagement mechanism 260. In the exemplary embodiment, each slidable engagement mechanism 250, 260 comprises a pin 270 attached to the upright member 210 that is constrained to move within a groove 280 defined into the platform 220. It will be appreciated that the pins 270 could alternately be attached to the platform 220 and the grooves 280 defined in the upright member 210. Likewise, other slidable engagement mechanisms can be readily substituted for the pin-in-groove mechanism that is illustrated.

Just as in the embodiment illustrated in FIG. 1, a tensioning device (not shown) is used to drive the upright member 210 relative to the platform 220. Driven one way, the base 200 is secured into a vehicle seat, or driven the opposite away to remove the base 200. As suggested by the arrows in FIG. 3, the tensioning device forces the platform 220 to press against the seat pan and the upright member 210 to push against the vehicle seat back and seatbelt just as base 100 in FIG. 1.

Figure 4:
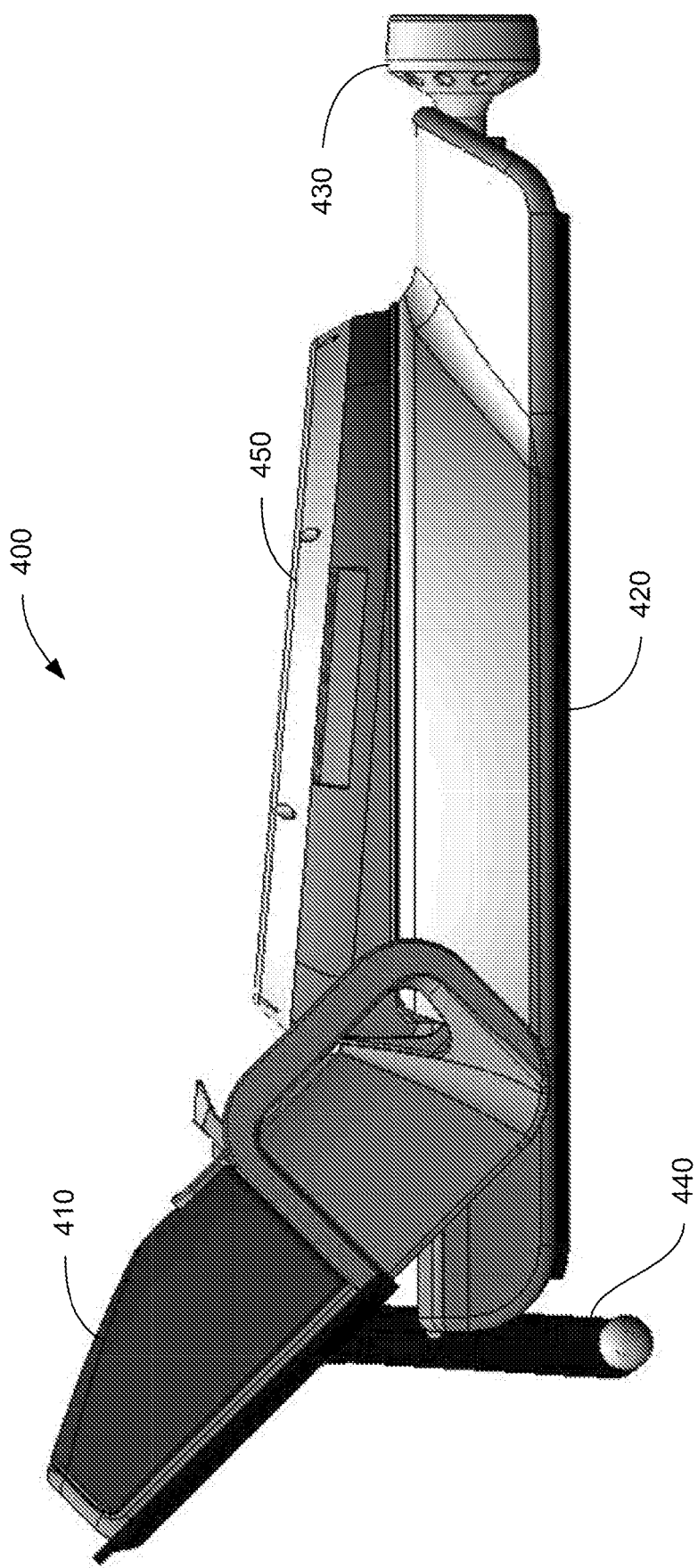
FIG. 4 is a side view of an exemplary base, according to yet another embodiment of the present invention.

FIG. 4 shows a side view of a base 400, embodying the principle of operation illustrated in FIGS. 2 and 3, and posed in a similar state as base 200 in FIG. 3. Base 400 includes an upright member 410 and a platform 420 that can be driven relative to one another by a tensioning device 430, described in more detail below. Also, the base 400 includes a foot 440 pivotally attached to the upright member 410 and slidably attached to the platform 420 so that the foot 440 extends downward as the tensioning device 430 tightens the base 400 into a vehicle seat. The foot 440 can wedge into the vehicle seat, sometimes extending between back and seat cushions, for greater stability and security.

Figure 5:
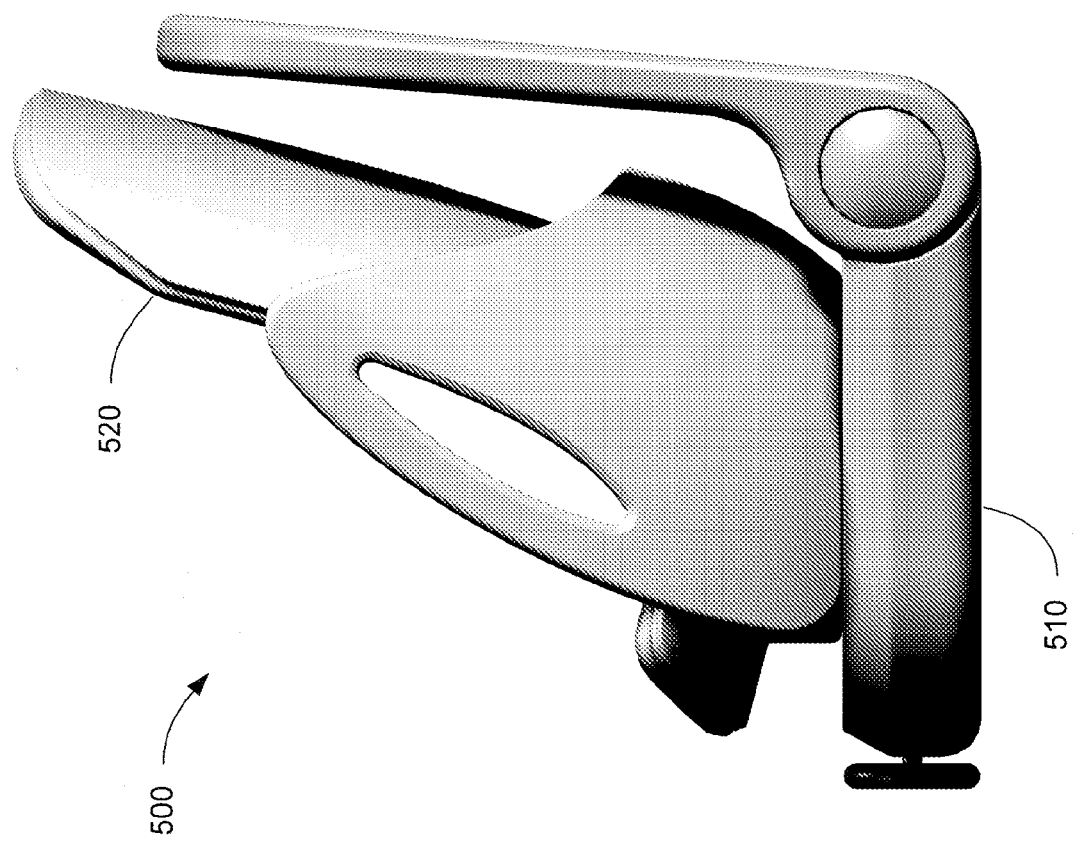
FIG. 5 is a side view of an exemplary modular child restraint system according to an embodiment of the invention.

While it will be appreciated that the base of the present invention can be part of an integral child restraint, the present invention is particularly valuable as a modular component of a modular child restraint system such as the one shown in FIG. 5. In FIG. 5, an exemplary modular child restraint system 500 comprises a base 510 coupled to a detachable seat portion 520 by an engagement mechanism (not shown). The base 400 of FIG. 4 illustrates one possible configuration for engaging a detachable seat portion (not shown). In this embodiment the seat portion engages a locking ring 450 disposed on a top side of the platform 420. Further details relating to suitable base-to-seat portion engagement mechanisms can be found in U.S. application No. Ser. No. 11/132,103 titled "Modular Child Restraint System". It will be appreciated that FIG. 5 also illustrates an integral child restraint system in which the base 510 and the seat portion 520 are permanently joined, obviating the need for the engagement mechanism.

Figure 6:
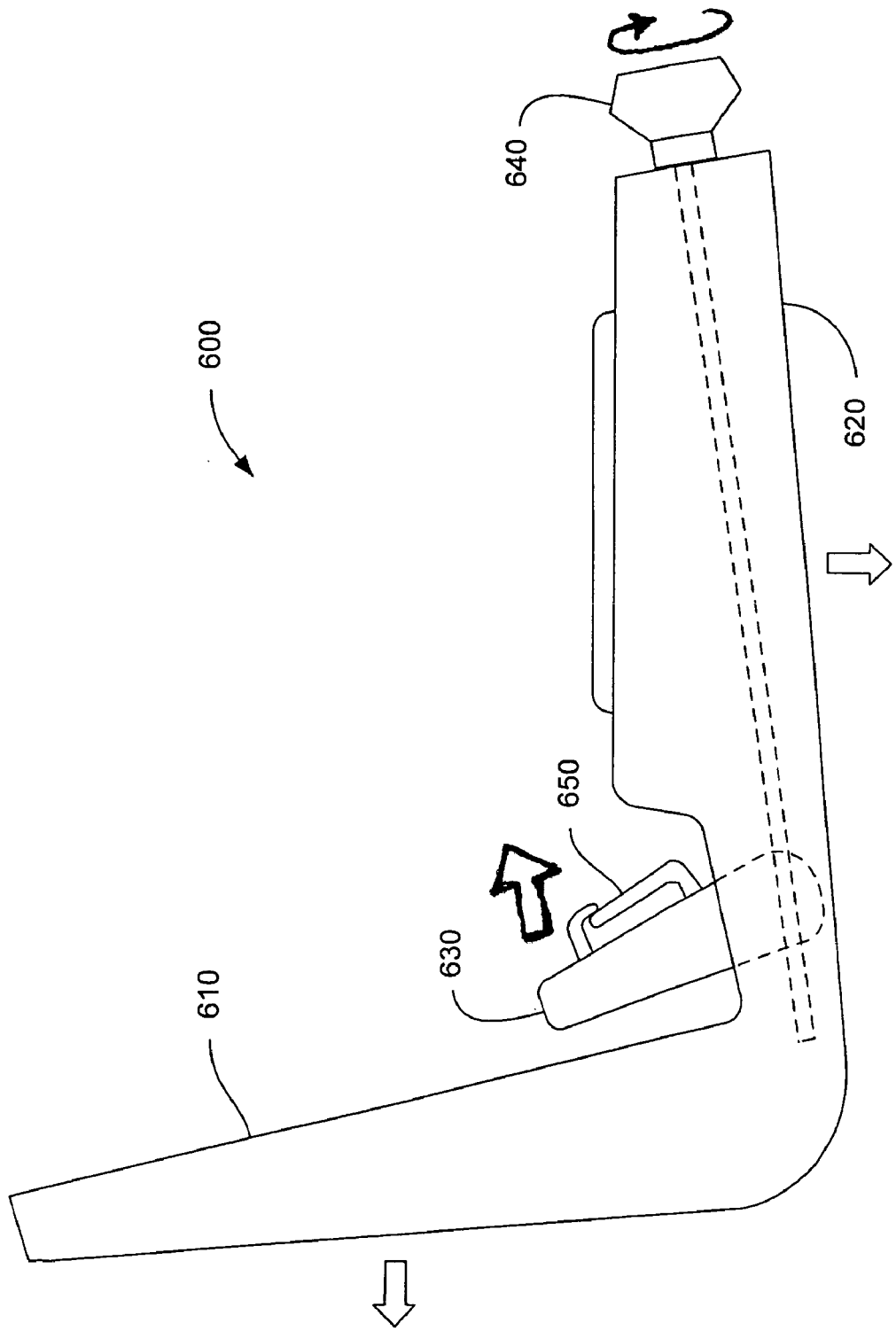
FIG. 6 is a side view of a schematic representation of still another exemplary base, according to an embodiment of the present invention.
Figure 8:
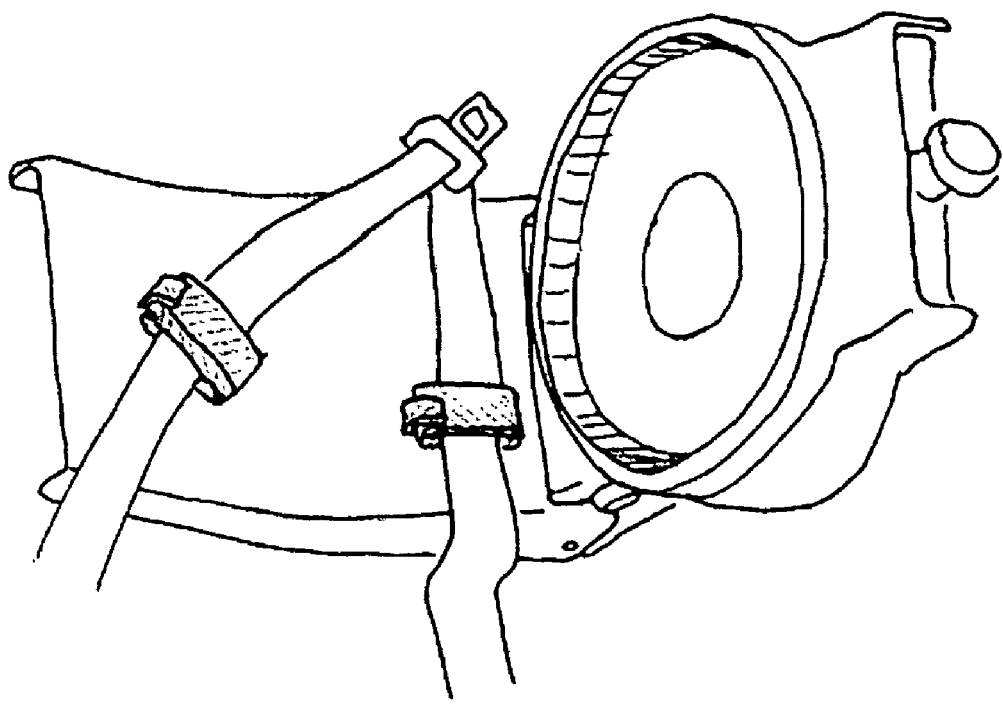
FIG. 8 is a perspective view of yet another exemplary base, according to an embodiment of the present invention.
Figure 7:
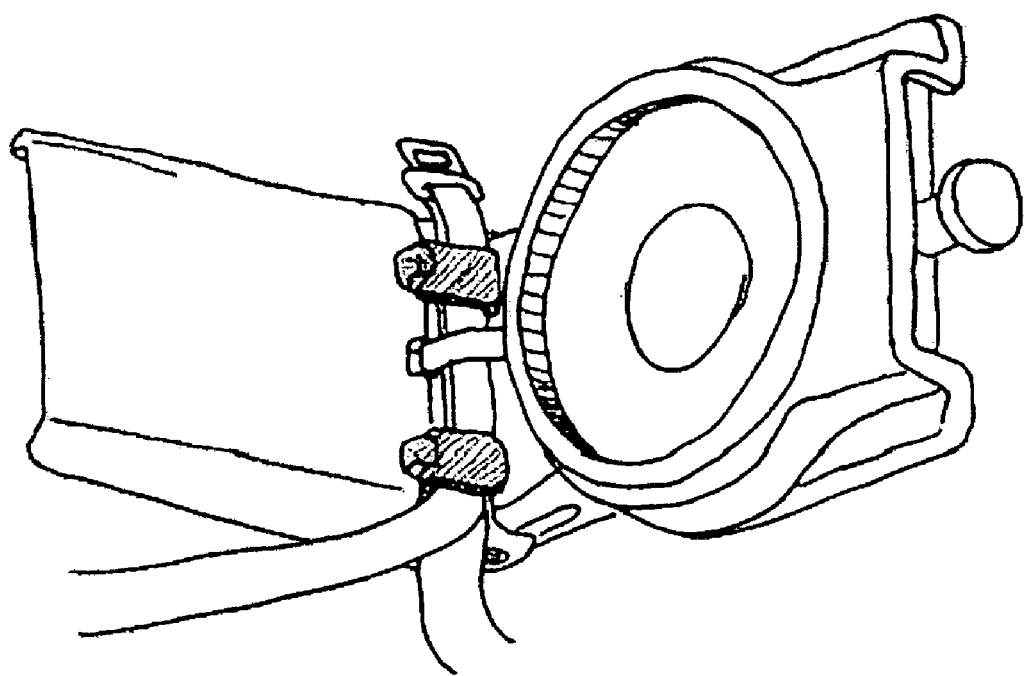
FIG. 7 is a perspective view of yet another exemplary base, according to an embodiment of the present invention.

Another exemplary embodiment of the invention is shown in FIG. 6. A base 600 comprises an upright member 610 and a platform 620 integrally joined to form a single essentially L-shaped member. A tensioning device includes a belt tensioner 630 that is slidably engaged with the platform 620 and drivable forward and back by a drive mechanism 640. A seat belt (not shown) loops through a securing means, such as a clasp 650, on the belt tensioner 630. Because the tension applied to the seat belt is applied in a direction that is neither purely vertical nor horizontal, the resulting force that presses the base 600 into the vehicle seat has both vertical and horizontal components, as shown.

It should be noted that although the embodiments described herein include an upright member such as upright member 610, this component is not strictly essential to the invention. For example, if upright member 610 were removed, the back side of the platform 620 would still engage the seat back of the vehicle seat. Such a base would be lighter and more compact.

Figure 10:
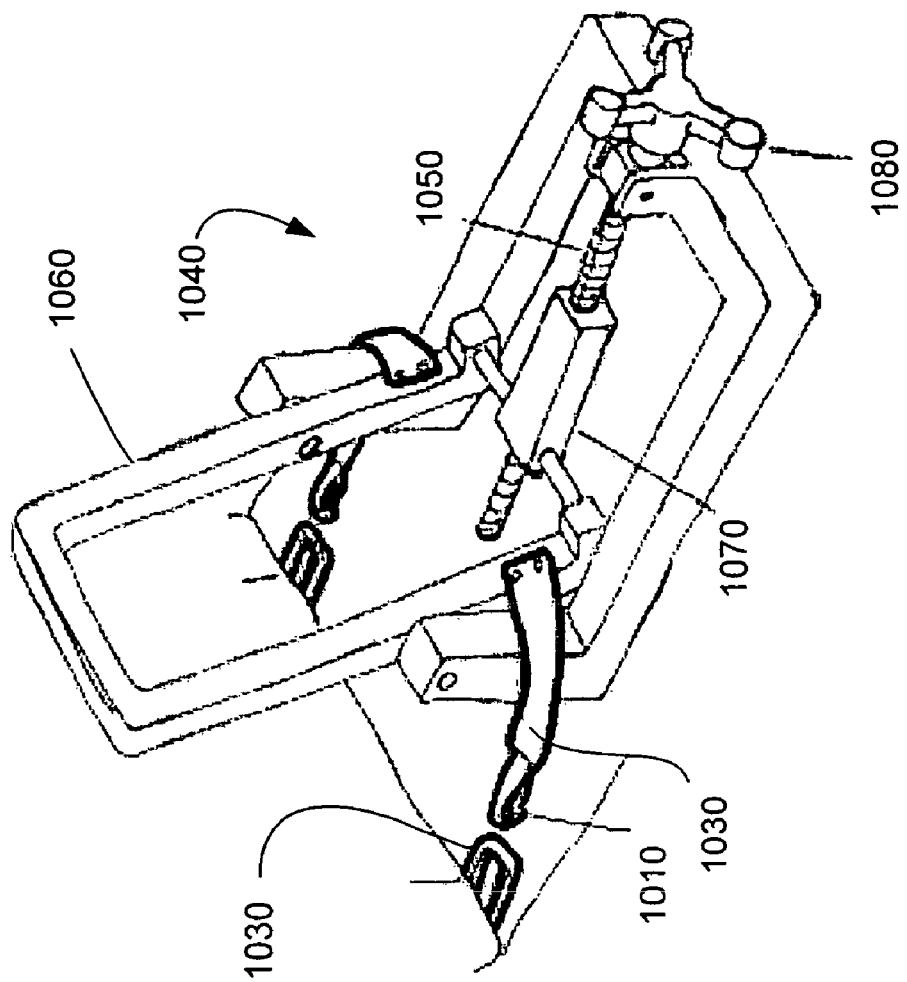
FIG. 10 is a perspective view of yet another exemplary base, according to an embodiment of the present invention.
Figure 9:
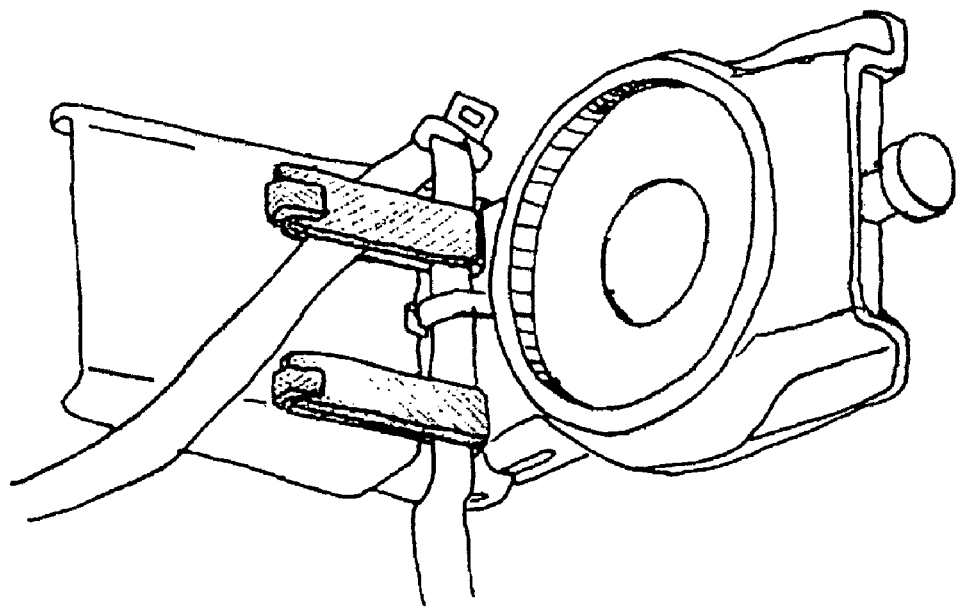
FIG. 9 is a perspective view of yet another exemplary base, according to an embodiment of the present invention.

FIGS. 7-10 illustrate different exemplary means for engaging a vehicle restraint. In each of the embodiments shown in FIGS. 7-9 two clasps, in different arrangements, are used to attach a seat belt to the upright member of the base. In the embodiment of FIG. 10, the vehicle restraint comprises two permanently attached clips 1010 at the ends of respective tethers 1020 that secure the upright member to two LATCH anchors 1030 attached to the vehicle seat. Other embodiments of the invention employ adjustable clasps, or similar means for securing the vehicle restraint to the base. In some embodiments, in place of the clasps shown in FIGS. 6-9, the means for engaging a vehicle restraint can simply be a molded recess with a width sufficient to receive a seat belt.

Figure 11:
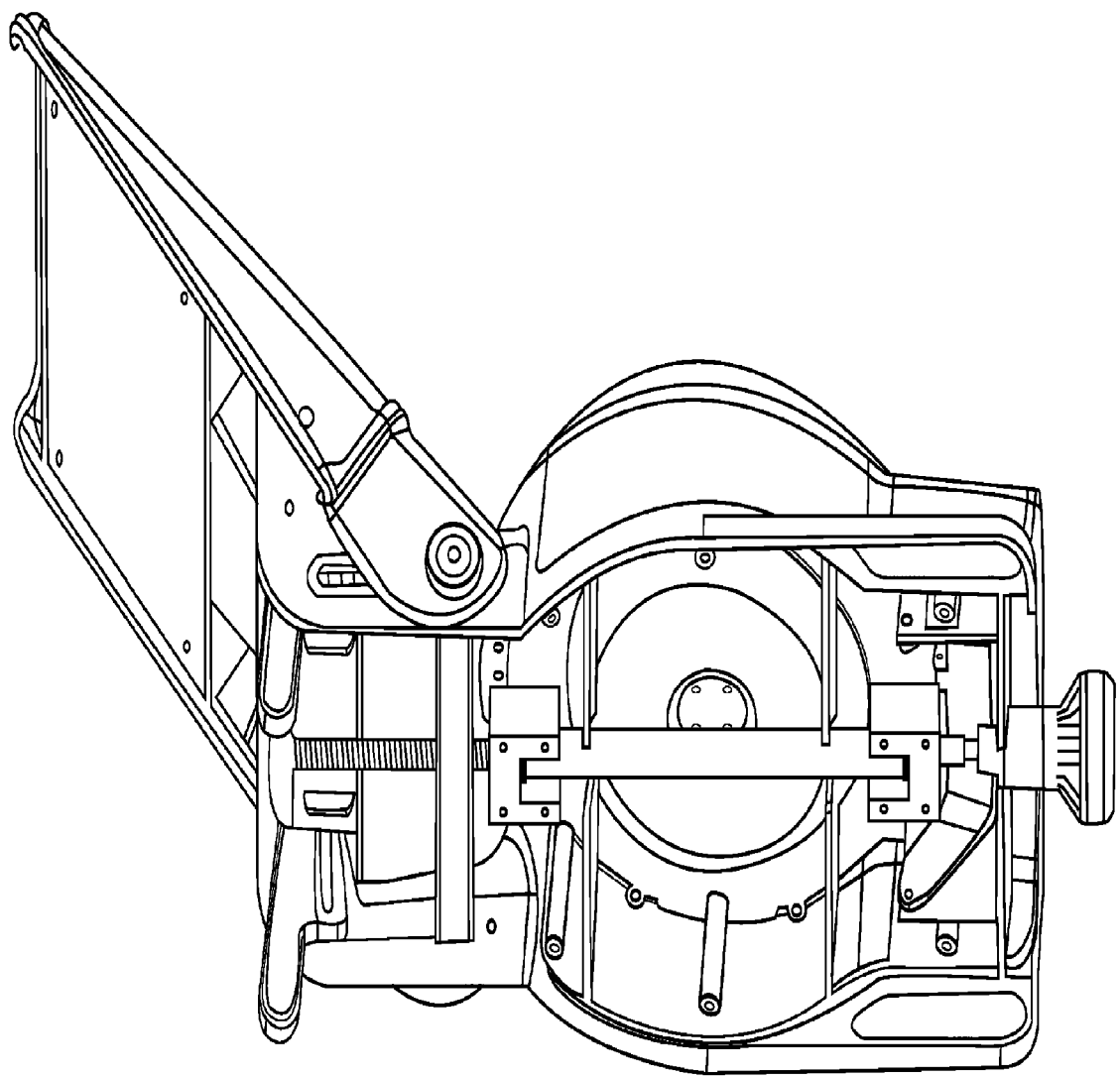
FIG. 11 is a bottom perspective view of yet another exemplary base, according to an embodiment of the present invention.

FIG. 10 also illustrates an exemplary embodiment of a screw-type tensioning device 1040. Although the tensioning device 1040 is shown in conjunction with a base similar to the embodiment of FIG. 1, it will be readily apparent that the tensioning device 1040 can be used with other embodiments. In this embodiment a lead screw 1050 actuates a movable upright member 1060 through a nut assembly 1070 when a knob 1080 is turned. The mechanism 1040 allows for force multiplication, in other words, for the use of some mechanical advantage so that a small force applied by the user is converted into substantially greater tension in the vehicle restraint. For example, in the embodiment of FIG. 10 the lead screw 1050 provides the mechanical advantage so that the relatively low force repeatedly applied by the user to turn the knob 1080 cumulatively translates into a much greater tension in the tethers 1020 of the vehicle restraint. FIG. 11 shows a bottom perspective view of another screw-type tensioning mechanism, similar to the one shown in FIG. 10, as applied to a base such as those shown in FIGS. 2-4.

Figure 12:
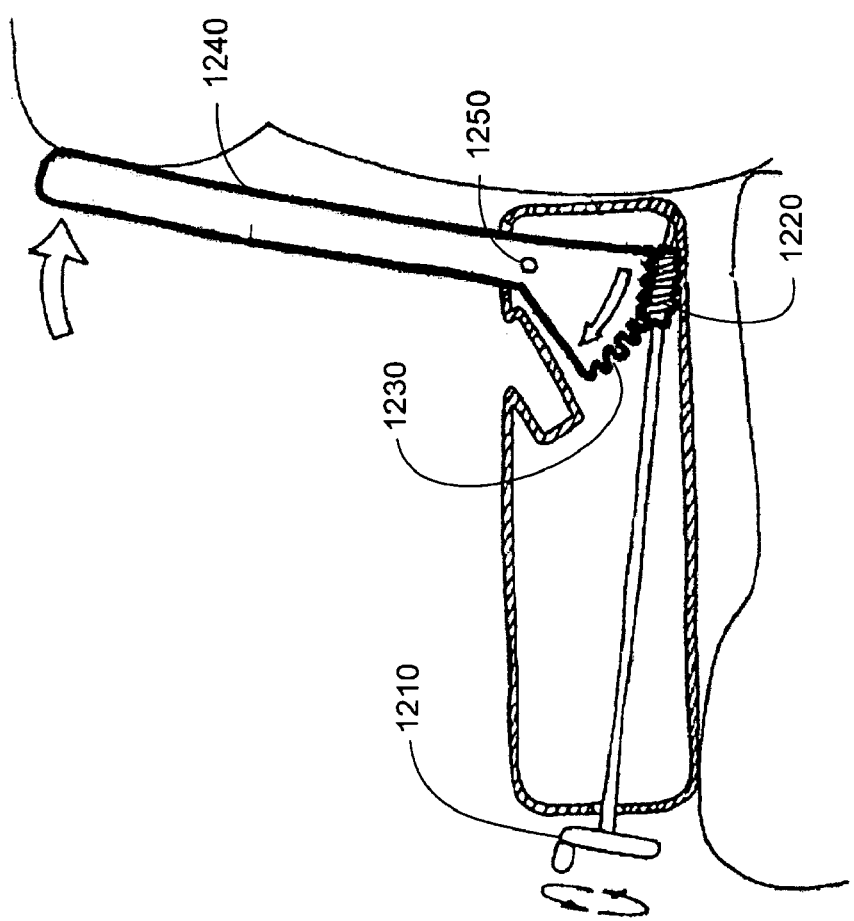
FIG. 12 is a cross-section of a base, according to another embodiment of the invention, comprising a tensioning device that employs a worm-gear.

FIGS. 12-15 show additional tensioning device embodiments. FIG. 12 shows a cross-section of a base comprising a tensioning device that employs a worm-gear. Here, turning a knob 1210 turns a worm 1220 which engages a worm wheel 1230 to move an upright member 1240 around a pivot 1250. One advantage of using a worm gear system is that worm gear trains are non-back driving and therefore they lock automatically.

Figure 13:
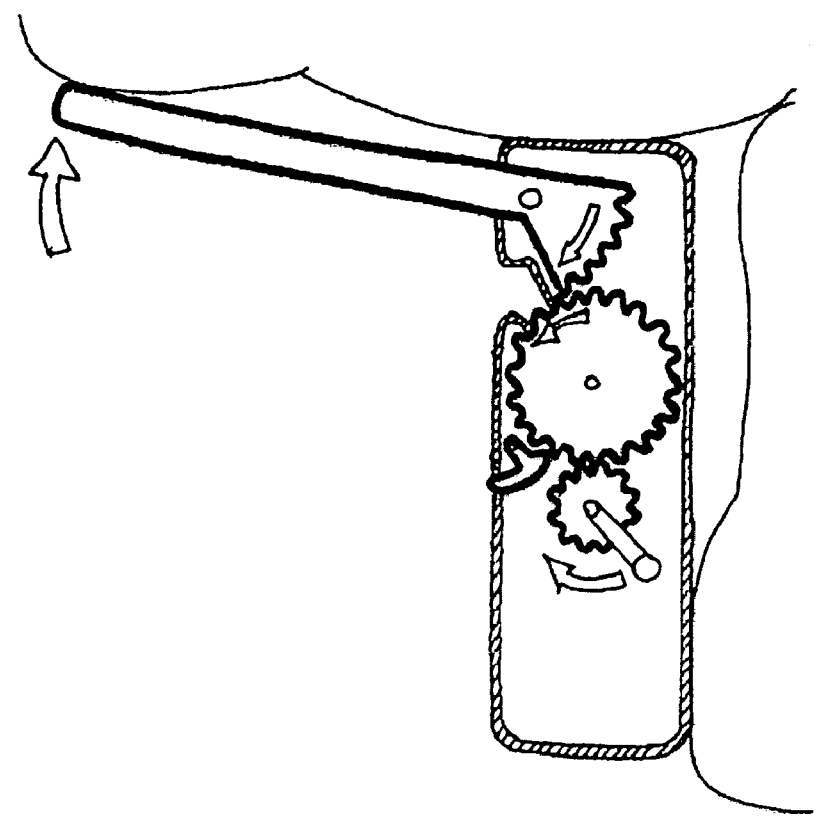
FIG. 13 is a cross-section of a base, according to still another embodiment of the invention, comprising a tensioning device that employs a ratchet and pawl.
Figure 14:
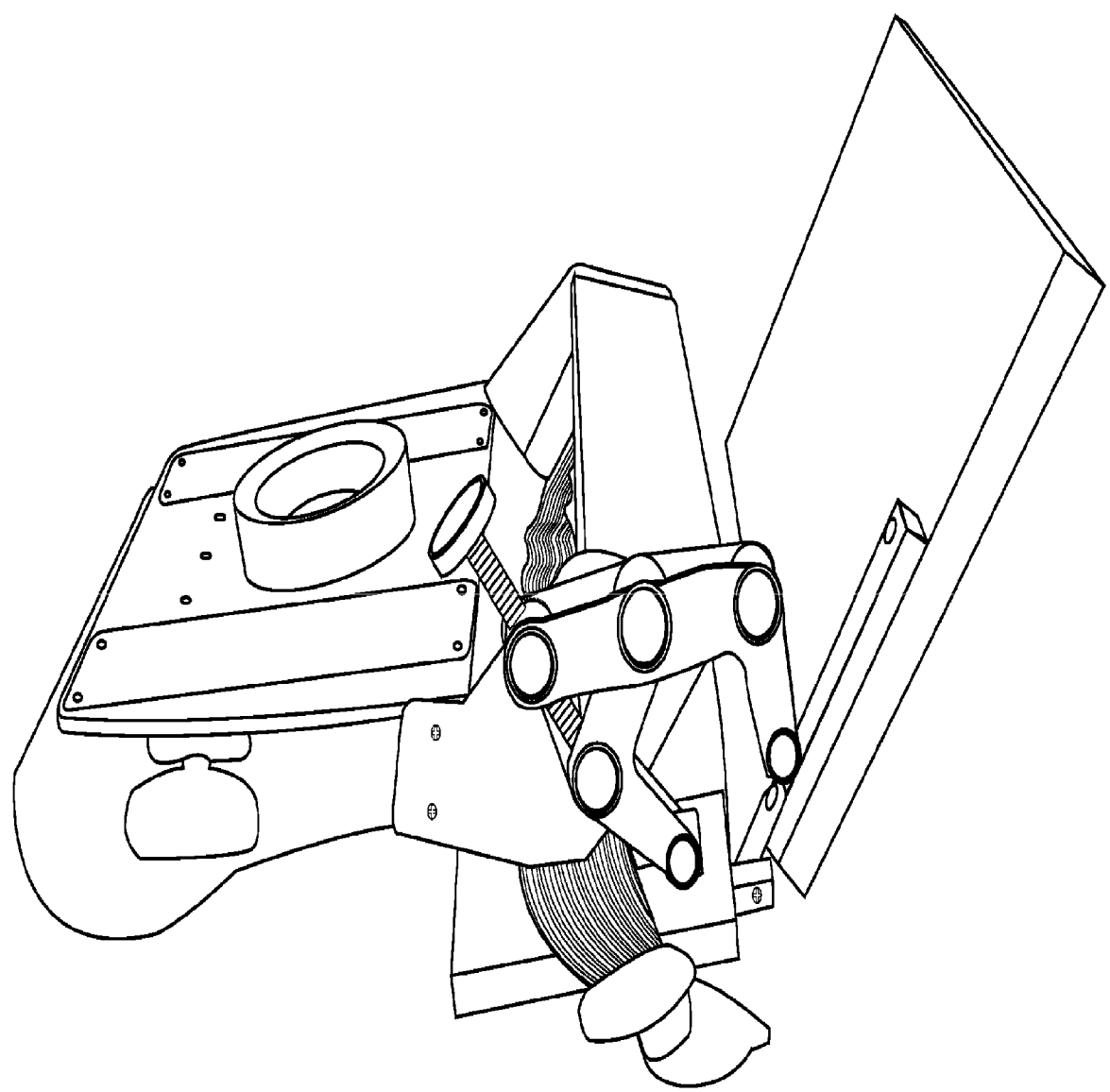
FIG. 14 is a perspective view of a base, according to yet another embodiment of the invention, comprising a screw-type tensioning device.
Figure 15:
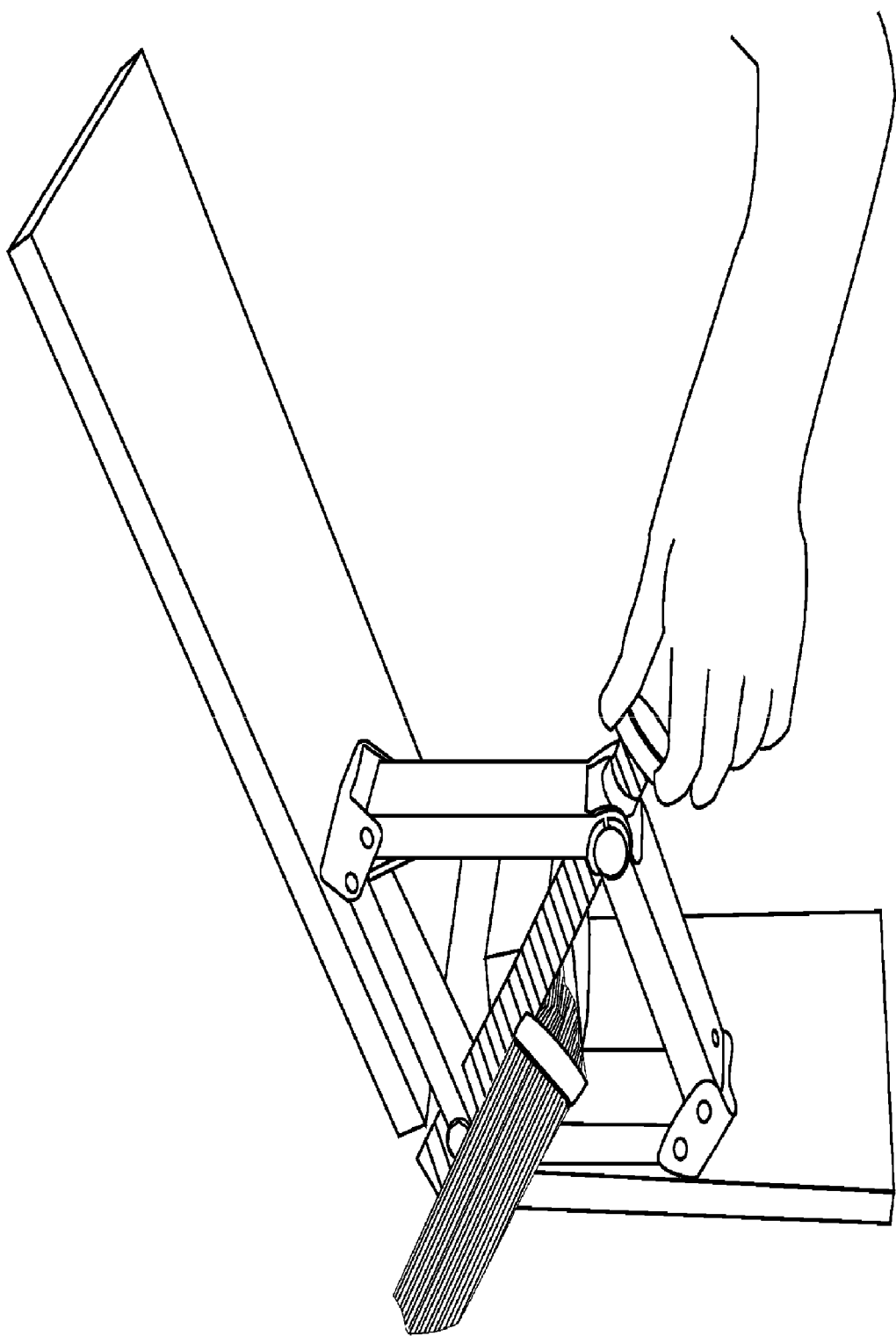
FIG. 15 is a perspective view of a base, according to yet another embodiment of the invention, comprising a screw-type tensioning mechanism.

FIG. 13 shows a cross-section of another base comprising a tensioning device that employs a ratchet and pawl. FIGS. 14 and 15 show still other embodiments that employ screw-type tensioning devices. It will be appreciated that although the various tensioning devices described herein are intended to be actuated by hand, in some embodiments an electric motor can be used to actuate these tensioning devices. The same is true for other types of mechanisms, such as pneumatic systems, which can be either hand-pumped, motor-driven, or operated off of a compressed air source.

Figure 16:
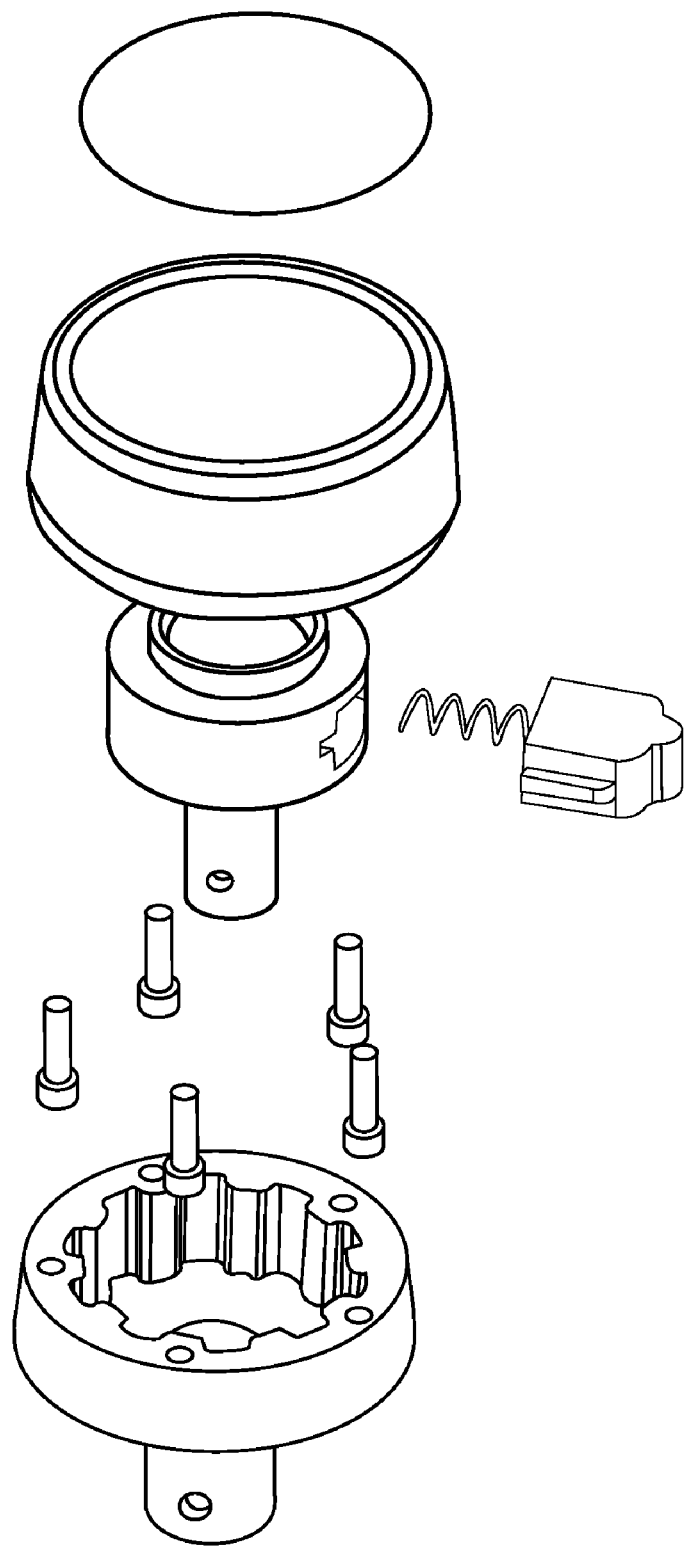
FIG. 16 is an exploded view of a torque control knob according to an embodiment of the invention.

FIG. 16 shows an exploded view of an exemplary torque control knob that can be used with any of the tensioning devices described herein. The torque control knob limits the amount of force applied by the tensioning device to prevent over-tensioning that can potentially damage the vehicle seat, the vehicle restraint, and the base of the invention. The torque control knob in FIG. 16 is designed to limit the torque in both turning directions, limiting the force applied to the vehicle seat in one direction, and limiting the force applied to the base itself in the other. It will be appreciated that the torque control knob of FIG. 16 is an example of a mechanical torque limiter, and that other types of torque limiters can also be used. For example, a torque limiter including an electronic strain sensor configured to sense the strain in the lead screw can be set to lock the knob or cause the knob to disengage from the lead screw above a strain threshold.

Figure 18:
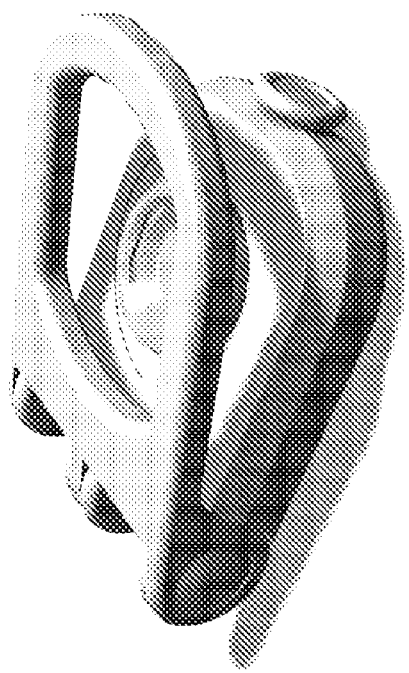
FIGS. 17 and 18 show perspective views of a foldable base according to an embodiment of the invention in two different positions.
Figure 17:
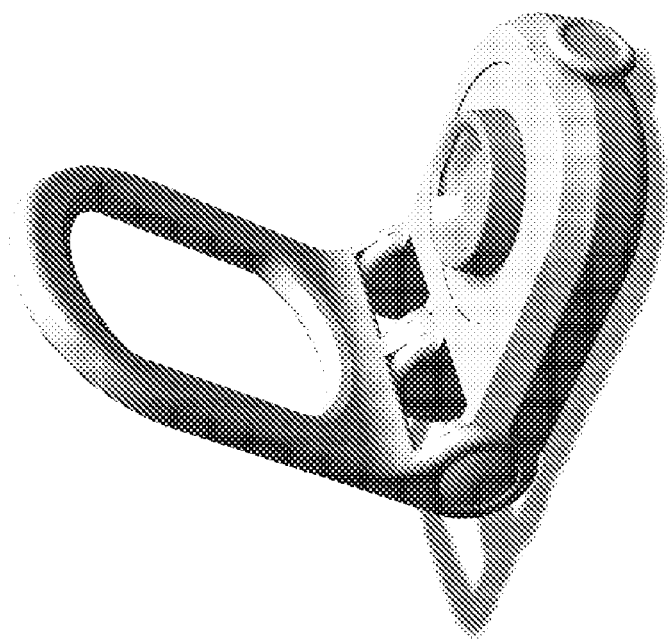

Some embodiments of the present invention provide a base that is foldable such that the upright member can be folded down over the platform. Making the base foldable in this way makes the base easier to carry and store. FIGS. 17 and 18 show an exemplary base with the upright member in two different positions, almost completely in the upright position in FIG. 17, and almost completely in the folded position in FIG. 18.

Figure 19:
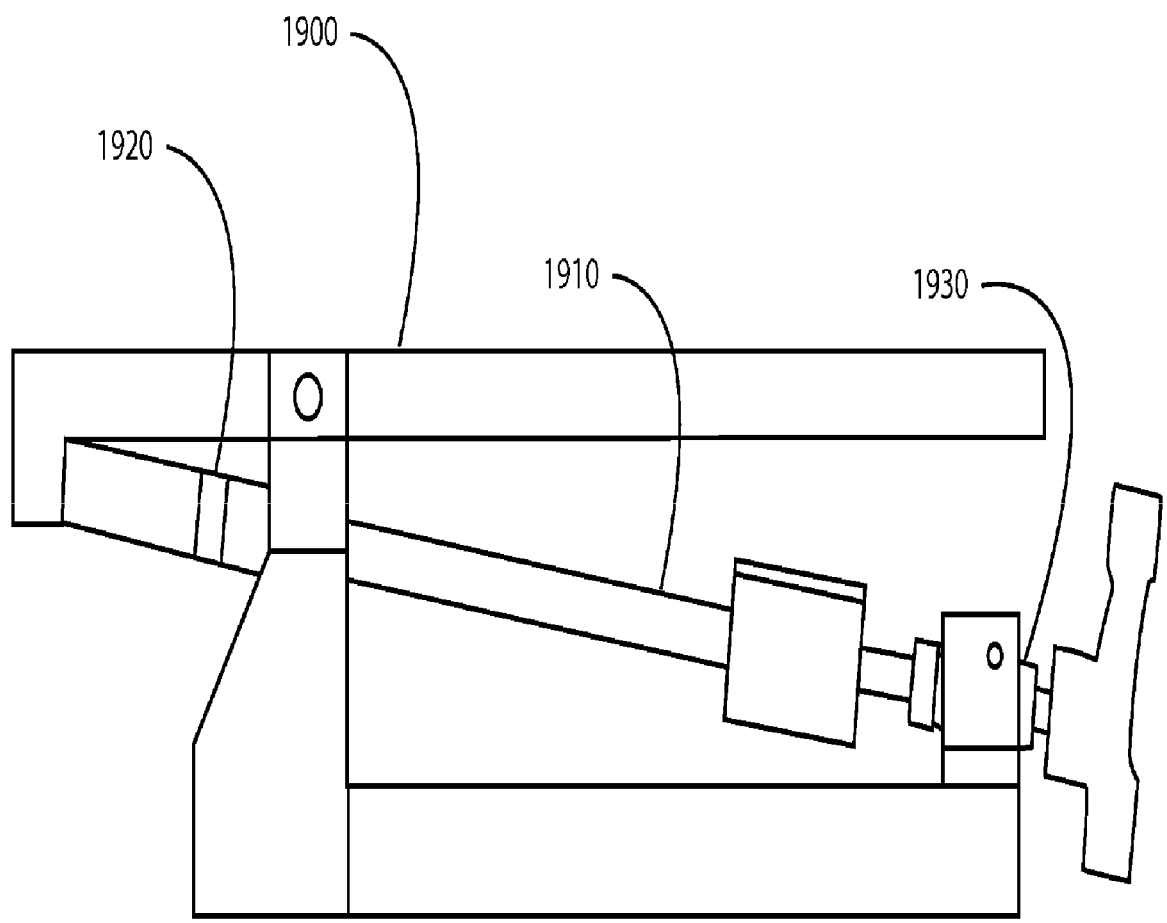
FIG. 19 is a side view of a tensioning device of another foldable base according to an embodiment of the invention.

FIG. 19 shows an exemplary tensioning mechanism that allows a base to fold as shown in FIGS. 17 and 18. In FIG. 19 an upright member 1900 is in the fully closed position. The tensioning mechanism in FIG. 19 comprises a back-drivable lead screw 1910, a ball nut 1920, and a clutch 1930. The ball nut 1920 allows the base to fold, and the clutch 1930 prevents the base from accidentally folding when installed and in use. The clutch 1930 also allows the upright member 1900 to be rapidly raised to the open position from the closed position without having to turn the lead screw 1900.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A base for securing a child restraint system to a vehicle seat with a vehicle restraint, the base comprising:
   an engagement mechanism for receiving a detachable seat portion of the child restraint system;
   a platform configured to rest on the vehicle seat;
   an upright member joined to the platform; and
   a tensioning device for tensioning the vehicle restraint, wherein the platform and upright member are operable to move and change orientation relative to each other in response to actuating the tensioning device.

2. The base of claim 1, wherein the tensioning device comprises a force-multiplying mechanism.

3. The base of claim 1, wherein the platform and the upright member are integrally joined.

4. The base of claim 1, wherein the platform and the upright member are pivotally attached.

5. The base of claim 1, wherein the platform and the upright member are hingedly attached.

6. The base of claim 1, wherein the platform engages the vehicle restraint.

7. The base of claim 1, wherein the upright member engages the vehicle restraint.

8. The base of claim 1, wherein the tensioning device drives the upright member relative to the platform.

9. The base of claim 1, wherein the tensioning device includes a lead screw.

10. The base of claim 1, wherein the tensioning device includes a torque limiter.

11. The base of claim 1, wherein the tensioning device includes a worm-gear.

12. The base of claim 1, wherein the tensioning device includes a ratchet and pawl.

13. The base of claim 1, further comprising an extendable foot.

14. The base of claim 13, wherein the foot is configured to extend between back and seat cushions of the vehicle seat.

15. The base of claim 1, wherein the upright member is configured to be folded down over the platform.

16. The base of claim 15, wherein the tensioning mechanism includes a clutch.

17. The child restraint system of claim 1, wherein the platform and the upright member are slidably attached.

18. The child restraint system of claim 1, wherein the platform and upright member are operable to rotate relative to each other in response to actuating the tensioning device.

19. The base of claim 1, wherein the upright member is operable to directly engage the seat back of the vehicle seat.

20. The base of claim 1, wherein the upright member is operable to be forced against the seat back of the vehicle seat when tensioning the vehicle restraint via the tensioning device.

21. A child restraint system comprising:
   a seat portion; and
   a base for securing the seat portion to a vehicle seat with a vehicle restraint, wherein the seat portion and the base are detachable, the base including:
   a platform configured to rest on the vehicle seat;
   an upright member joined to the platform; and
   a tensioning device for tensioning the vehicle restraint, wherein the platform and upright member are operable to move relative to each other in response to actuating the tensioning device.

22. The child restraint system of claim 21, wherein the seat portion and the base are integral.

23. The child restraint system of claim 21, wherein the platform and upright member are operable to move and change angular orientation relative to each other in response to actuating the tensioning device.

24. The base of claim 21, wherein the upright member is operable to directly engage the seat back of the vehicle seat.

25. The base of claim 21, wherein the upright member is operable to be forced against the seat back of the vehicle seat when tensioning the vehicle restraint via the tensioning device.

\* \* \* \* \*